United States Patent
Hamaguchi

(10) Patent No.: US 12,535,381 B2
(45) Date of Patent: Jan. 27, 2026

(54) INFORMATION PROCESSING APPARATUS, INFORMATION PROCESSING METHOD, AND PROGRAM

(71) Applicant: FUJIFILM Corporation, Tokyo (JP)

(72) Inventor: Yuya Hamaguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 171 days.

(21) Appl. No.: 18/360,689

(22) Filed: Jul. 27, 2023

(65) Prior Publication Data

US 2023/0366779 A1 Nov. 16, 2023

Related U.S. Application Data

(63) Continuation of application No. PCT/JP2021/042351, filed on Nov. 18, 2021.

(30) Foreign Application Priority Data

Feb. 5, 2021 (JP) .................... 2021-017584

(51) Int. Cl.
| | | |
|---|---|---|
| *G01M 11/02* | (2006.01) | |
| *G06V 10/25* | (2022.01) | |
| *G06V 10/44* | (2022.01) | |
| *G06V 10/74* | (2022.01) | |

(52) U.S. Cl.
CPC ......... *G01M 11/0242* (2013.01); *G06V 10/25* (2022.01); *G06V 10/44* (2022.01); *G06V 10/761* (2022.01); *G06V 2201/07* (2022.01)

(58) Field of Classification Search
CPC ...... G06V 10/25; G06V 10/761; G06V 10/44; G06V 2201/07; G06T 7/00; G06F 16/53; G01M 11/0242; G01M 11/0221
See application file for complete search history.

(56) References Cited

U.S. PATENT DOCUMENTS

| 6,285,515 B1 * | 9/2001 | Kitazawa | G02B 5/005 |
| | | | 359/726 |
| 2008/0144186 A1 * | 6/2008 | Feng | G02B 7/028 |
| | | | 359/666 |

(Continued)

FOREIGN PATENT DOCUMENTS

| JP | H11-337707 A | 12/1999 |
| JP | 2014-183565 A | 9/2014 |

(Continued)

OTHER PUBLICATIONS

Hasegawa "Optical Component Position Adjustment Support Device, Method for Supporting Optical Component Position Adjustment, Optical Component Position Adjustment Support Program, and Method for Manufacturing Lens Device", Aug. 6, 2020, WO2020158325 A1 (Year: 2020).*

(Continued)

*Primary Examiner* — Sang H Nguyen
(74) *Attorney, Agent, or Firm* — Studebaker Brackett PLLC

(57) ABSTRACT

An object of the present invention is to provide an information processing apparatus, an information processing method, and a program which make it possible to appropriately identify a lens from an image showing a cross section of the lens.

In the present invention, a processor detects an existing region of a lens in a target image showing a cross section of a part including the lens in a target device including the lens, and the processor identifies the lens of the target device existing in the existing region based on a feature amount of the existing region by an identification model constructed by machine learning using a plurality of learning images showing a cross section of the lens.

7 Claims, 5 Drawing Sheets

(56) References Cited

U.S. PATENT DOCUMENTS

| | | | | |
|---|---|---|---|---|
| 2016/0134802 | A1* | 5/2016 | Inoue | H04N 23/672 |
| | | | | 348/349 |
| 2018/0293729 | A1 | 10/2018 | Hashimoto | |
| 2019/0251699 | A1* | 8/2019 | Chih | G06V 20/10 |
| 2020/0175663 | A1* | 6/2020 | Horita | G06T 7/0002 |
| 2020/0404186 | A1* | 12/2020 | Wakui | G02B 21/008 |
| 2021/0015440 | A1* | 1/2021 | Hamauzu | H04N 23/30 |
| 2021/0019899 | A1* | 1/2021 | Ono | G02B 7/34 |

FOREIGN PATENT DOCUMENTS

| | | |
|---|---|---|
| JP | 2016-178704 A | 10/2016 |
| JP | 2018-175217 A | 11/2018 |

OTHER PUBLICATIONS

International Search Report issued in PCT/JP2021/042351; mailed Jan. 25, 2022.

International Preliminary Report On Patentability (Chapter I) and Written Opinion of the International Searching Authority issued in PCT/JP2021/042351; issued Aug. 3, 2023.

Omori, Takahide et al.; "Basic study on the introduction of machine learning into the shape design of dielectric lens antennas"; Lecture proceeding of the 2019 Annaual Meeting of the Institue of Electrical Engineers of Japan; Mar. 1, 2019; Total 23 pages.

An Office Action; "Notice of Reasons for Refusal," mailed by the Japanese Patent Office on Jun. 17, 2025, which corresponds to Japanese Patent Application No. 2022-579346 and is related to U.S. Appl. No. 18/360,689; with English language translation.

* cited by examiner

FIG. 1

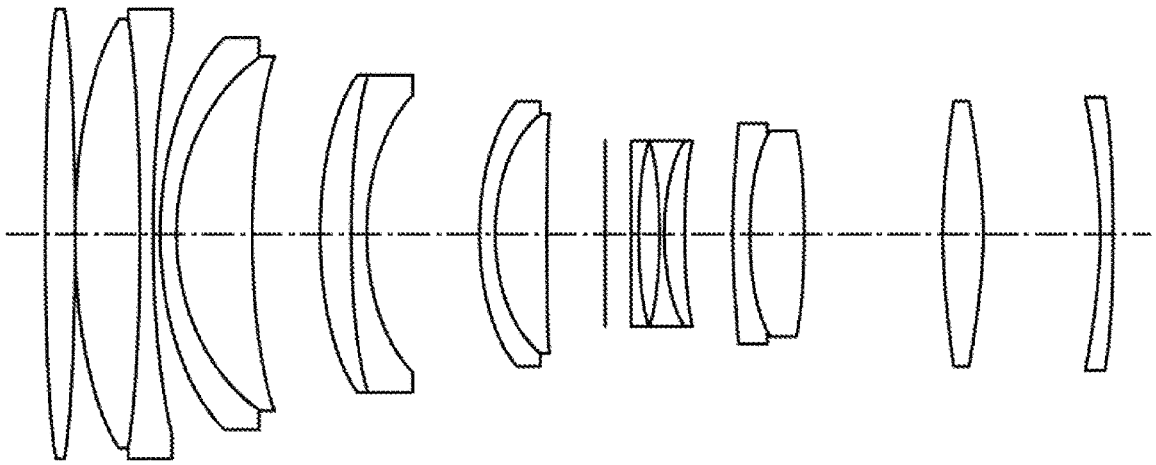

FIG. 2

| PATENT PUBLICATION INFORMATION (IDENTIFICATION NUMBER_ DRAWING NUMBER) | LENS INFORMATION (CHARACTER STRING INFORMATION) |
|---|---|
| pic¥AA00002837_000002_90.png | NNTOTNTTOTTT,TTTOTTNTOTNN |
| pic¥AA00002837_000003.png | NNTTTNTOTT,TTOTNTTTNN |
| pic¥AA00002837_000008.png | NNTOTNTTOOTTT,TTTOOTTNTOTNN |
| pic¥AA00002837_000013.png | NNTTTNTTOOTT,TTOOTTNTTTNN |
| pic¥AA00002837_000018.png | NONTNTTOTNTT,TTNTOTTNTNON |
| pic¥AA00002837_000023.png | NNTOTNTTOOTT,TTOOTTNTOTNN |
| pic¥AA00002837_000028.png | N NOPTTTOTOT,TOTOTTTPON N |

FIG. 3

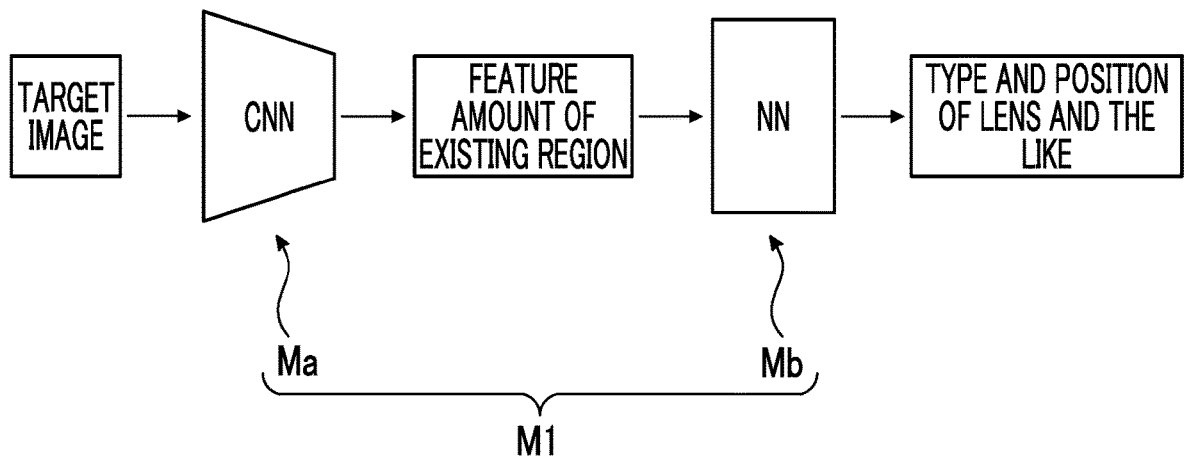

TTONPPNNTNOPNTTN

ND PROGRAM

CROSS-REFERENCE TO RELATED APPLICATIONS

This application is a Continuation of PCT International Application No. PCT/JP2021/042351 filed on Nov. 18, 2021, which claims priority under 35 U.S.C. § 119(a) to Japanese Patent Application No. 2021-017584 filed on Feb. 5, 2021. The above applications are hereby expressly incorporated by reference, in their entirety, into the present application.

BACKGROUND OF THE INVENTION

1. Field of the Invention

The present invention relates to an information processing apparatus, an information processing method, and a program, and particularly relates to an Times New Roman information processing apparatus, an information processing method, and a program that identify a lens from an image showing a cross section of the lens provided in a device.

2. Description of the Related Art

Information about a lens provided in a device such as a camera may be used for a variety of purposes, for example, being accumulated and used for constructing a database (see, for example, JP2016-178704A).

In JP2016-178704A, lens information is accumulated in a database. In addition, in JP2016-178704A, a part of a lens unit on an objective side is imaged by the camera, and the lens information in the database is searched for based on the captured image. Then, the lens information found by the search is transmitted to the camera.

SUMMARY OF THE INVENTION

Acquisition of lens information is necessary as a precondition for using information about a lens, such as constructing the database of the lens information in JP2016-178704A. As an example of a method of acquiring the lens information, a method is exemplified in which an image showing a cross section of a lens provided in a device is found from documents such as papers and publications, a lens is identified from the image, and a result of the identification is acquired as the lens information.

However, even in an image showing a cross section of the same type of lens, appearance and features of the image may differ due to a difference in image quality such as resolution. In addition, in a case in which the image of the lens is a drawing (illustration), the image may change depending on a thickness of a drawing line, a drawing method, or the like.

Here, in a case in which, based on the assumption of various cases of a drawing style including the image quality, a rule for identifying the lens from a lens cross-sectional image is prepared for each style, it is possible to cope with the difference in drawing style. However, in that case, it takes time and effort to prepare a large number of identification rules. In addition, it is difficult to identify a lens appearing in an image drawn in a drawing style for which the identification rule is not prepared.

On the other hand, in a case in which information about the lens identified from the image is accumulated, the information can be referred to thereafter, and the accumulated information can be effectively used, for example, for lens collation.

The present invention has been made in view of the above circumstances, and an object of the present invention is to provide an information processing apparatus, an information processing method, and a program which make it possible to appropriately identify a lens from an image showing a cross section of the lens.

In addition, another object of the present invention is to make effective use of information about the lens identified from the image.

In order to achieve to above object, an information processing apparatus according to an aspect of the present invention comprises: a processor, in which the processor detects an existing region of a lens in a target image showing a cross section of a part including the lens in a target device including the lens, and identifies the lens of the target device existing in the existing region based on a feature amount of the existing region by an identification model constructed by machine learning using a plurality of learning images showing a cross section of the lens.

In addition, the identification model may be configured by machine learning using the plurality of learning images including two or more same-type lens cross-sectional images showing cross sections of the same type of lens with different drawing styles, the identification model being a model that identifies a lens shown by each of the two or more same-type lens cross-sectional images as the same type of lens.

In addition, in the information processing apparatus according to the aspect of the present invention, the processor preferably accumulates information about the identified lens of the target device to construct a database of the information.

Further, it is preferable that the processor acquires input information about a lens provided in a search device, and outputs the information about the lens of the target device accumulated in the database in association with the search device, based on the input information.

Furthermore, it is more preferable that the processor acquire input information about a lens included in a search device, calculates a degree of similarity between the lens of the search device and the lens of the target device based on the input information and the information about the lens of the target device accumulated in the database, and outputs the information about the lens of the target device accumulated in the database in association with the degree of similarity.

In addition, the processor may detect the existing region for each lens in the target image showing a cross section of a part including lens groups arranged in a row in the target device including the lens groups. In this case, the processor preferably identifies a lens in the lens group existing in the existing region for each existing region by using the identification model, and aggregates information about the lens in the lens group identified for each existing region with the lens group as one unit, and accumulates the aggregated information in the database.

In addition, in the above configuration, the processor may specify, for each existing region, a type of the lens in the lens group identified for each existing region. In addition, the processor preferably generates character string information representing the type of each lens in an order in which the lenses are arranged in the lens group, based on the type of the lens in the lens group specified for each existing region and a position of the existing region in the target image, and accumulates the generated character string information in the database.

In addition, in a case in which a plurality of the lens groups are shown in the target image, the processor may generate generates the character string information for each lens group, and the character string information generated for each lens group may be accumulated in the database for each lens group.

In addition, the processor may acquire input information about a lens included in a search device, and, in a case in which the search device includes a lens group, the processor may acquire character string information representing a type of each lens in an order in which lenses are arranged in the lens group of the search device, as the input information. In this case, the processor preferably calculates a first degree of similarity between the lens group of the search device and the lens group of the target device, based on the acquired character string information about the lens group of the search device and the character string information about the lens group of the target device accumulated in the database. In addition, the processor preferably outputs the character string information about the lens group of the target device accumulated in the database in association with the first degree of similarity.

In addition, the processor may acquire input information about a lens included in a search device, and, in a case in which the search device includes a lens group, the processor may acquire character string information representing a type of each lens in an order in which lenses are arranged in the lens group of the search device, as the input information. In this case, the processor may change any character to blank in the acquired character string information about the lens group of the search device. Then, the processor preferably calculates a second degree of similarity between the lens group of the search device and the lens group of the target device, based on the changed character string information about the lens group of the search device and the character string information about the lens group of the target device accumulated in the database. In addition, the processor preferably outputs the character string information about the lens group of the target device accumulated in the database in association with the second degree of similarity.

In addition, the processor may accumulate, in the database, the information about the identified lens of the target device in association with information about a document including the target image.

In addition, the processor may detect the existing region of the lens from the target image using an object detection algorithm.

In addition, the above-described object can be achieved by an information processing method comprising: via a processor, a step of detecting an existing region of a lens in a target image showing a cross section of a part including the lens in a target device including the lens; and via the processor, a step of identifying the lens of the target device existing in the existing region based on a feature amount of the existing region by an identification model constructed by machine learning using a plurality of learning images showing a cross section of the lens.

In addition, the information processing method may further comprise: via the processor, a step of accumulating information about the identified lens of the target device to construct a database of the information.

In addition, according to the present invention, it is possible to realize a program causing the processor to execute each step of the information processing method.

According to the present invention, it is possible to appropriately identify, from an image showing a cross section of a lens, the lens appearing in the image regardless of a drawing style of the image. In addition, it is possible to effectively use information about the lens identified from the image.

BRIEF DESCRIPTION OF THE DRAWINGS

FIG. 1 is a diagram showing an example of a target image.

FIG. 2 is a diagram showing a structural example of a database of lens information.

FIG. 3 is a conceptual diagram of an identification model.

DESCRIPTION OF THE PREFERRED EMBODIMENTS

Figure 4:
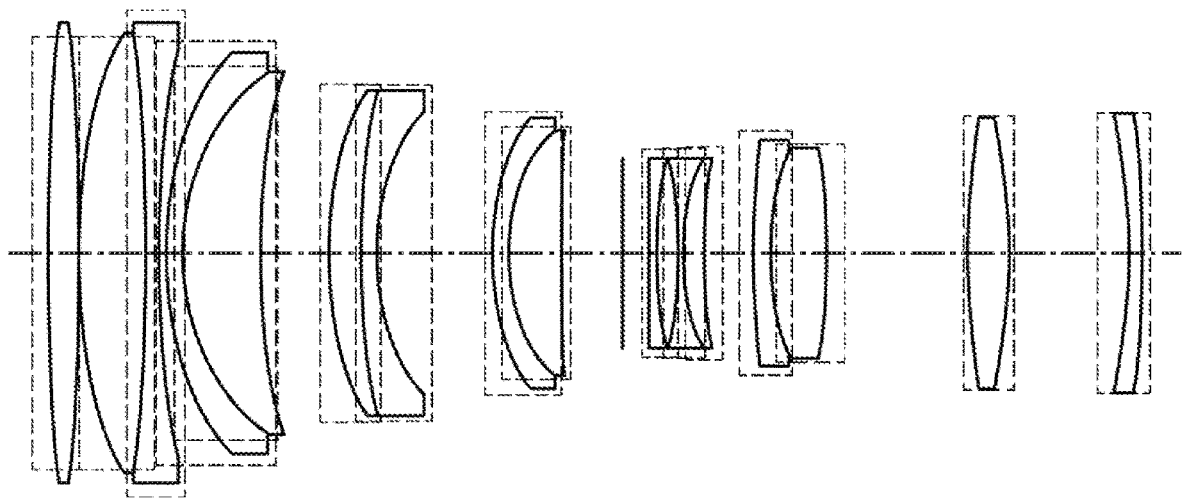
FIG. 4 is a diagram showing an example of a result of detection of an existing region of a lens in the target image.

An information processing apparatus, an information processing method, and a program according to an embodiment of the present invention (hereinafter, referred to as "the present embodiment") will be described below with reference to the accompanying drawings.

The following embodiment is merely an example for the purpose of explaining the present invention in an easy-to-understand manner, and does not limit the present invention. That is, the present invention is not limited to the following embodiment, and various improvements or modifications can be made without departing from the gist of the present invention. In addition, the present invention includes an equivalent thereof.

In the following description, unless otherwise specified, the "image" is assumed to be image data that is digitized (converted into data) and can be processed by a computer. In addition, the image includes an image captured by a camera or the like, a drawing (illustration) drawn by drawing creation software or the like, drawing data acquired by reading a hand-drawn or printed drawing with a scanner or the like, and the like.

Overview of Information Processing Apparatus of Present Embodiment

An information processing apparatus according to the present embodiment (hereinafter, simply referred to as an information processing apparatus) comprises a processor and analyzes a target image of a target device. The target device is an optical device equipped with one or a plurality of lenses, and includes, for example, an imaging device such as a camera, an observation device such as a finder for a camera, and a terminal equipped with an imaging function, such as a mobile phone or a smartphone.

As shown in FIG. 1, the target image is an image showing a cross section of a part of the target device including at least a lens (hereinafter, a lens cross-sectional image). For example, in a case in which the target device is a digital camera having an imaging lens, a cross-sectional image of the imaging lens corresponds to the target image. In a case in which the target device comprises a single lens, a lens cross-sectional image in which the lens appears is treated as the target image. On the other hand, in a case in which the target device comprises a lens group consisting of a plurality of lenses, a lens cross-sectional image in which the entire lens group appears is treated as the target image. The lens group refers to a plurality of lenses arranged in a row in a straight line, as shown in FIG. 1.

In addition, the target image includes, for example, an image published or inserted in documents such as papers, patent publications, magazines, and websites. In the following, a case in which a lens cross-sectional image published in patent publications is treated as the target image will be described as an example. As a matter of course, the following contents can be applied to documents other than the patent publications.

The information processing apparatus analyzes the target image in the patent publication and identifies a lens of the target device appearing in the target image from a result of the analysis. Specifically, the information processing apparatus identifies the lens of the target device appearing in the target image by an identification model described below, and, in detail, specifies a type of the identified lens and a position of the lens in the target image. The position in the target image refers to coordinates (strictly speaking, two-dimensional coordinates) in a case in which a reference point set in the target image is used as the origin.

Here, in a case in which a single lens appears in the target image, a type of the lens and a position of the lens in the target image are specified. On the other hand, in a case in which a lens group appears in the target image, a type of each lens in the lens group and a position of the lens in the target image are specified, and an order of the lenses, that is, which type of lens is disposed at each position of the lens group, is specified.

In the following, it is assumed that the lens of the target device is a spherical lens, and there are four types thereof, specifically, a convex lens, a concave lens, a convex meniscus lens, and a concave meniscus lens. Note that, the types of lenses are not limited to the above four types, and may include types other than the above (for example, an aspherical lens).

In the present embodiment, character information (specifically, a reference numeral) is given to the lens of the target device of which the type is specified. Specifically, for example, a convex lens is given "T", a concave lens is given "O", a convex meniscus lens is given "P", and a concave meniscus lens is given "N". The characters to be given to each type of lens are not particularly limited.

On the other hand, to the lens group, character string information in which the reference numerals are arranged according to the order of the lenses in the lens group is given. The character string information represents the type of each lens in the order in which the lenses are arranged in the lens group. For example, character string information "TON" is given to a lens group consisting of three lenses arranged in the order of a convex lens, a concave lens, and a concave meniscus lens from the head.

The character string information about the lens group is generated based on the type and position (coordinates) of each lens in the lens group. For example, the character string information is generated by disposing the character information (reference numeral) indicating the type of each lens in order from the lens at a position closest to the reference position.

In addition, the information processing apparatus constructs a database by accumulating the information about the lens or the lens group of the target device identified for each target image, specifically, the character information indicating the type of the lens, the character string information about the lens group, or the like.

In the database, the information about the lens or the lens group of the target device (hereinafter, also referred to as lens information) is associated with a target image in which the lens or lens group appears, as shown in FIG. 2. In a detailed description, the lens information is accumulated in the database in association with information about a document including the target image, specifically, an identification number of a patent publication in which the target image is published, a drawing number assigned to the target image in the patent publication, and the like.

Further, the information processing apparatus reads out and outputs lens information satisfying a predetermined condition from the database. Accordingly, for example, information about a lens of a target device that is the same as or similar to that of a search device can be obtained from the database using information about a lens provided in the search device as key information.

In the present embodiment, the term "search" means extracting information corresponding to the search device from the lens information accumulated in the database, or specifying the information based on a relationship or a relevance with the search device. The search device is a device selected as a search target by a user of the information processing apparatus, and comprises a lens or a lens group as with the target device.

An output mode of the lens information is not particularly limited, and the lens information may be displayed on a screen or a sound indicating the content of the lens information may be generated (reproduced). A method of selecting the target device from which the lens information is output is also not particularly limited, and for example, information about the lens of the target device whose degree of similarity (degree of similarity will be described below) to the search device is equal to or greater than a reference value may be output. Alternatively, only information about the lens of the target device from the one having the higher degree of similarity to the upper Nth (where N is a natural number of 1 or more) may be output. Alternatively, the lens information may be output for all the target devices in order from the one having the highest degree of similarity.

Furthermore, by specifying the patent publication associated with the searched lens information, it is possible to find the patent publication in which a lens cross-sectional image showing a lens or a lens group of the same or similar type as the lens or lens group included in the search device is published.

As described above, in the present embodiment, it is possible to identify, from a lens cross-sectional image included in a document such as a patent publication, a lens appearing in the image and to store information about the lens in a database. Then, by using the database, a lens that satisfies a predetermined condition can be specified, and a document in which a lens cross-sectional image showing the lens is published can be found.

<About Identification Model>

An identification model used in the present embodiment (hereinafter, referred to as an identification model M1) will be described with reference to FIG. 3. The identification model M1 is a model for identifying, from the target image, a lens or a lens group appearing in the image. As shown in FIG. 3, the identification model M1 of the present embodiment is configured by a derivation model Ma and a specific model Mb.

The derivation model Ma is a model for deriving a feature amount of an existing region in the target image by inputting the target image. As shown in FIG. 4, the existing region is a rectangular region in which a lens exists in the target image, and in the present embodiment, one lens (specifically, an image of a lens cross section) exists in one existing region. As shown in FIG. 4, in the target image showing the lens group, the same number of existing regions as the number of lenses composing the lens group exists.

The derivation model Ma is configured by, for example, a convolutional neural network (CNN) having a convolutional layer and a pooling layer in an intermediate layer. Examples of the CNN model include a 16-layer CNN (VGG16) of an Oxford visual geometry group, an Inception model (GoogLeNet) of Google, a 152-layer CNN (Resnet) by Kaiming He, and an improved Inception model (Xception) by Chollet.

In deriving the feature amount of the existing region by the derivation model Ma, the existing region is specified in the target image. Specifically, an image of one lens cross section is detected for each lens in the target image, and a rectangular region surrounding the detected image is set for each lens in the target image. A function of specifying the existing region in the target image is installed in the derivation model Ma by machine learning described below.

The feature amount output from the derivation model Ma is a learning feature amount in the convolutional neural network CNN, and is a feature amount specified in a general image recognition (pattern recognition) process. Then, the feature amount derived by the derivation model Ma is input to the specific model Mb for each region.

The specific model Mb is a model for specifying a lens type corresponding to the feature amount of the existing region derived by the derivation model Ma, and geometric information of the existing region by inputting the feature amount. The geometric information of the existing region includes a position of the existing region in the target image, for example, coordinates (xy coordinates) of one vertex in the existing region, a width of the existing region (a length in an x direction), and a height of the existing region (a length in a y direction).

In the present embodiment, the specific model Mb is configured by, for example, a neural network (NN), and, in specifying a lens type corresponding to the feature amount of the existing region, a plurality of candidates (candidates for the lens type) are specified. A softmax function is applied to the plurality of specified candidates, and a certainty degree is calculated for each candidate. The certainty degree is a numerical value indicating a probability (certainty and prediction accuracy) that the type of the lens exists in the existing region for each of the plurality of candidates. The total number of n pieces (where n is a natural number) of certainty degrees to which the softmax function is applied is 1.0.

In the specific model Mb, among the plurality of candidates specified for each existing region, a candidate determined according to the certainty degree, for example, a candidate having the highest certainty degree is specified as a type of a lens existing in the existing region. As described above, according to the specific model Mb, the type of the lens appearing in the target image is selected from the plurality of candidates specified based on the feature amount of the existing region of the lens according to the certainty degree of each candidate. In a case of outputting the candidate selected as the type of the lens, the certainty degree of the candidate may also be output.

According to the identification model M1 described above, the lens existing in the existing region can be identified based on the feature amount of the existing region in the target image.

The identification model M1 (specifically, each of the two models Ma and Mb constituting the identification model M1) is constructed by machine learning using a plurality of learning images showing a cross section of a lens and a ground truth label indicating a type of the lens as a learning data set. In the present embodiment, the lens cross section indicated by the learning image is a cross section of any of the four types of spherical lenses. On the other hand, in a case in which the lens of the target device includes an aspherical lens, machine learning may be executed by adding a learning image showing a cross section of the aspherical lens, and an identification model capable of identifying the aspherical lens may be constructed. However, even in a case in which the lens of the target device includes the aspherical lens, an identification model that does not detect the aspherical lens may be constructed. Alternatively, an identification model may be constructed in which the aspherical lens is replaced with one having the closest shape among the four types of spherical lenses for detection.

The number of learning data sets used for machine learning is preferably large, preferably 50,000 or more, from the viewpoint of improving an accuracy of learning.

For the lens cross-sectional image used as the learning image, an image at a normal position, and an image rotated by 90 degrees, an image rotated by 180 degrees, and an image rotated by 270 degrees from the normal position are prepared, and these four types of images may be included in the learning image.

The learning image may be a lens cross-sectional image randomly extracted. Alternatively, a lens cross-sectional image selected under a certain condition may be used as the learning image.

The machine learning executed for constructing the identification model M1 is, for example, supervised learning, and a method thereof is deep learning (that is, a multi-layer neural network). However, the present invention is not limited to this, and a type (algorithm) of the machine learning may be unsupervised learning, semi-supervised learning, reinforcement learning, or transduction. A technique of the machine learning may be genetic programming, inductive logic programming, Boltzmann machine, matrix factorization (MF), factorization machine (FM), support vector machine, clustering, Bayesian network, extreme learning machine (ELM) or decision tree learning. As a method of minimizing an objective function (loss function) in the machine learning of the neural network, a gradient descent method, an error back propagation method, or the like may be used.

In addition, in the machine learning of the present embodiment, a plurality of learning images including two or more lens cross-sectional images (hereinafter, the same-type lens cross-sectional images) showing cross sections of the same type of lens with different drawing styles may be used. In a case in which the lens cross section is a line drawing, the drawing style includes a line thickness, a color, a line type, a degree of inclination of line, a drawing method of a curved part (curvature or the like), a lens orientation, a dimension of each part of a lens, a scale ratio, presence or absence of an auxiliary line such as a center line, presence or absence of a line indicating an optical path of light passing through a lens, a background color, a hatching style, and presence or absence of a subscript such as a reference numeral. In addition, a resolution (density of a lattice representing an image) in a case in which the lens cross-sectional image is represented by image data such as a bitmap format is also included in the drawing style.

In the above case, machine learning is executed such that the identification model M1 (strictly speaking, the derivation model Ma) for deriving a common feature amount from two or more same-type lens cross-sectional images is constructed. For example, for each of a plurality of learning images with different drawing styles for the same type of lens, a ground truth label indicating the type of the lens is attached, and supervised learning is executed. Accordingly, the identification model M1 capable of deriving the common feature amount from two or more same-type lens cross-sectional images and identifying the lens indicated by each of the same-type lens cross-sectional images as the same type of lens is constructed.

Configuration of Information Processing Apparatus of Present Embodiment

Next, a configuration example of an information processing apparatus 10 shown in FIG. 5 will be described. In addition, in FIG. 5, an external interface is described as "external I/F".

Figure 5:
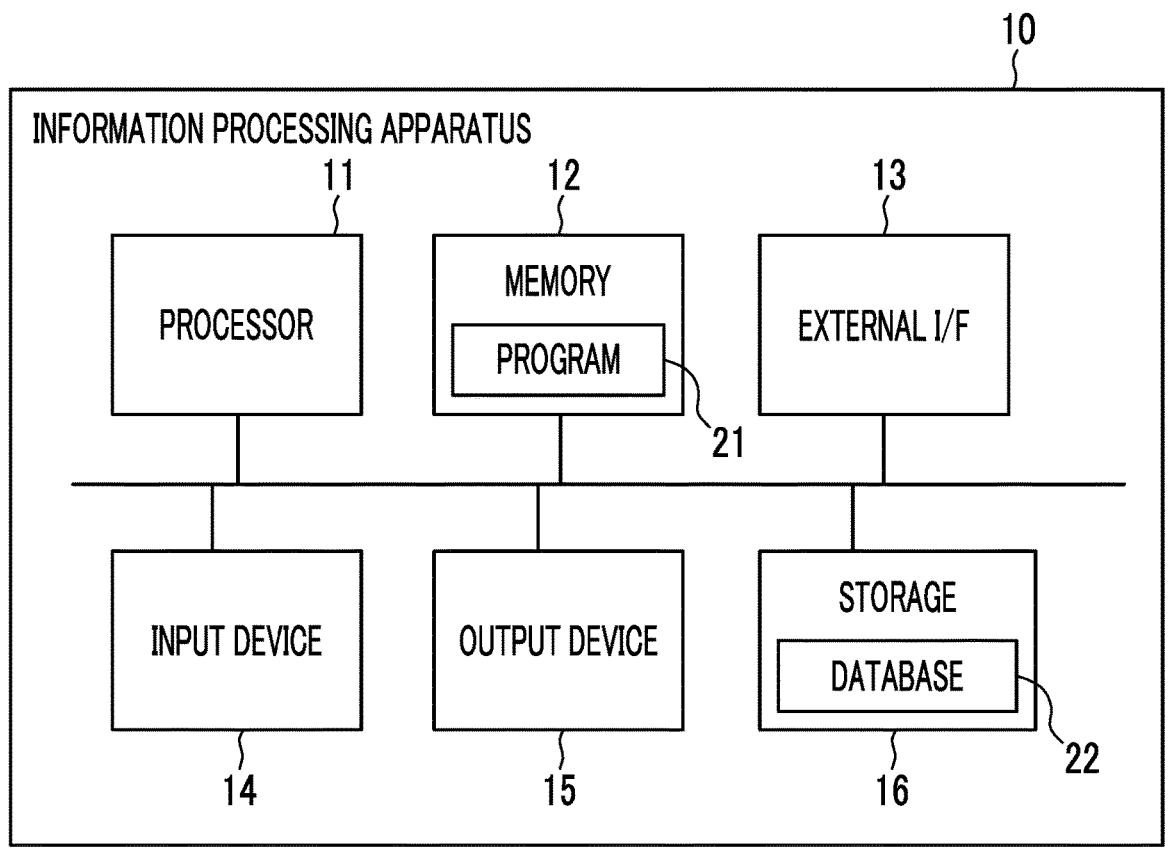
FIG. 5 is a diagram showing a configuration of an information processing apparatus according to an embodiment of the present invention.

As shown in FIG. 5, the information processing apparatus 10 is a computer in which a processor 11, a memory 12, an external interface 13, an input device 14, an output device 15, and a storage 16 are electrically connected to each other. In the present embodiment, the information processing apparatus 10 is configured by one computer, but the information processing apparatus 10 may be configured by a plurality of computers.

The processor 11 is configured to execute a program 21 described below and execute processing for exerting a function of the information processing apparatus 10. The processor 11 is configured of, for example, one or a plurality of central processing units (CPUs) and a program 21 described below.

A hardware processor constituting the processor 11 is not limited to a CPU, and may be a field programmable gate array (FPGA), a digital signal processor (DSP), an application specific integrated circuit (ASIC), a graphics processing unit (GPU), or another integrated circuit (IC), or may be a combination thereof. In addition, the processor 11 may be one integrated circuit (IC) chip that exerts the functions of the entire information processing apparatus 10, as typified by a system on chip (SOC) or the like.

In addition, one processing unit included in the information processing apparatus according to the embodiment of the present invention may be configured of one of the various processors described above, or may be configured of a combination of two or more processors of the same type or a different type, for example, a combination of a plurality of FPGAs, a combination of an FPGA and a CPU, and the like.

In addition, a plurality of functions of the information processing apparatus according to the embodiment of the present invention may be configured by one of the various processors, or two or more of the plurality of functions may be configured by one processor.

In addition, one processor may be configured of a combination of one or more CPUs and software, and a plurality of functions may be realized by the processor.

The hardware processor described above may be an electric circuit (circuitry) in which circuit elements such as semiconductor elements are combined.

The memory 12 is configured of a semiconductor memory such as a read only memory (ROM) and a random access memory (RAM). The memory 12 provides a work region for the processor 11 and temporarily stores various types of data generated by the processing executed by the processor 11.

The memory 12 stores a program 21 for causing a computer to function as the information processing apparatus 10 of the present embodiment. The program 21 includes the following programs p1 to p5.

p1: a program for constructing the identification model M1 by machine learning
p2: a program for detecting the existing region of the lens in the target image
p3: a program for identifying a lens existing in the detected existing region
p4: a program for accumulating information about the identified lens and constructing a database
p5: a program for outputting the lens information accumulated in the database The program 21 may be acquired by being read from a recording medium readable by a computer, or may be acquired by being received (downloaded) through a network such as the Internet or an intranet.

The external interface 13 is an interface for connection with an external device. The information processing apparatus 10 communicates with an external device, for example, a scanner or another computer on the Internet via the external interface 13. Through such communication, the information processing apparatus 10 can acquire data for machine learning or acquire data of a patent publication in which a target image is published.

The input device 14 includes, for example, a mouse, a keyboard, and the like, and receives a user's input operation. The information processing apparatus 10 can acquire a learning image to be used for machine learning, for example, by drawing a lens cross-sectional image through the input device 14 by a user. In addition, for example, in a case of searching for information about a lens of a target device of the same or similar type as the search device, the user operates the input device 14 to input information about a lens included in the search device. Accordingly, the information processing apparatus 10 can acquire the input information about the lens included in the search device.

The output device 15 includes, for example, a display, a speaker, and the like, and is a device for displaying search results based on the input information, for example, information about a lens of a target device of the same or similar type as the search device, or reproducing a sound. In addition, the output device 15 can output the lens information accumulated in the database 22.

The storage 16 is configured of, for example, a flash memory, a hard disc drive (HDD), a solid state drive (SSD), a flexible disc (FD), a magneto-Optical disc (MO disc), a compact disc (CD), a digital versatile disc (DVD), a secure digital card (SD card), a universal serial bus memory (USB memory), or the like. Various types of data including data for machine learning are stored in the storage 16. Further, the storage 16 also stores various models constructed by machine learning, including the identification model M1.

Furthermore, the information (lens information) about the lens of the target device identified from the target image is accumulated in the storage 16 in association with information about a document including the target image, specifically, an identification number of a patent publication in which the target image is published, or the like. That is, the database 22 of the lens information is constructed in the storage 16.

In the case shown in FIG. 2, the information associated with the lens information includes, in addition to the identification information of the patent publication, a drawing number or the like assigned to the target image in the patent publication. In a case in which the document including the target image is a paper, a paper title, a page on which the target image is published, and the like need only be associated with the lens information. In addition, in a case in which the document including the target image is a book, a title of the book, a page on which the target image is published, and the like need only be associated with the lens information.

As shown in FIG. 2, the lens information accumulated in the database 22 includes character information indicating a type of a lens appearing in the target image. In particular, the lens information in a case in which a lens group appears in the target image includes character string information representing a type of each lens in the lens group in the order in which the lenses are arranged. In addition, in the case shown in FIG. 2, as the character string information about the lens group, character string information representing a type of a lens in the order from one end to the other end in the lens group, and character string information representing a type of a lens in the order from the other end to the one end in the lens group (hereinafter, referred to as character string information of a mirror image) are accumulated in the database 22. This is so that, in a case of searching for the character string information, both character string information in which the types of the lenses in the lens group are arranged in a forward direction and character string information in which the types of the lenses in the lens group are arranged in a reverse direction (for example, character strings NTOP and POTN) can be searched for. However, the present invention is not limited to this, and the character string information of the mirror image may not be accumulated, but only the character string information in which the types of the lenses in the lens group are arranged in one direction may be accumulated. In this case, in a case of the search, the accumulated character string information may be converted into the character string information in which the lenses are arranged in a reversed order so that the search can be performed.

In the present embodiment, the storage 16 is a device built in the information processing apparatus 10, but the storage 16 is not limited to this, and the storage 16 may include an external device connected to the information processing apparatus 10. In addition, the storage 16 may include an external computer (for example, a server computer for a cloud service) that is communicably connected via a network. In this case, a part or an entirety of the above-described database 22 may be stored in an external computer constituting the storage 16.

The hardware configuration of the information processing apparatus 10 is not limited to the above-described configuration, and constituent devices can be added, omitted, or replaced as appropriate according to specific embodiments.

<About Information Processing Flow>

Next, an information processing flow using the information processing apparatus 10 will be described.

In the information processing flow described below, an information processing method according to the embodiment of the present invention is adopted. That is, each step in the following information processing flow constitutes the information processing method according to the embodiment of the present invention, and is executed by the processor 11 of the computer constituting the information processing apparatus 10. Specifically, each step in the information processing flow is executed by the processor 11 executing the program 21.

Figure 6:
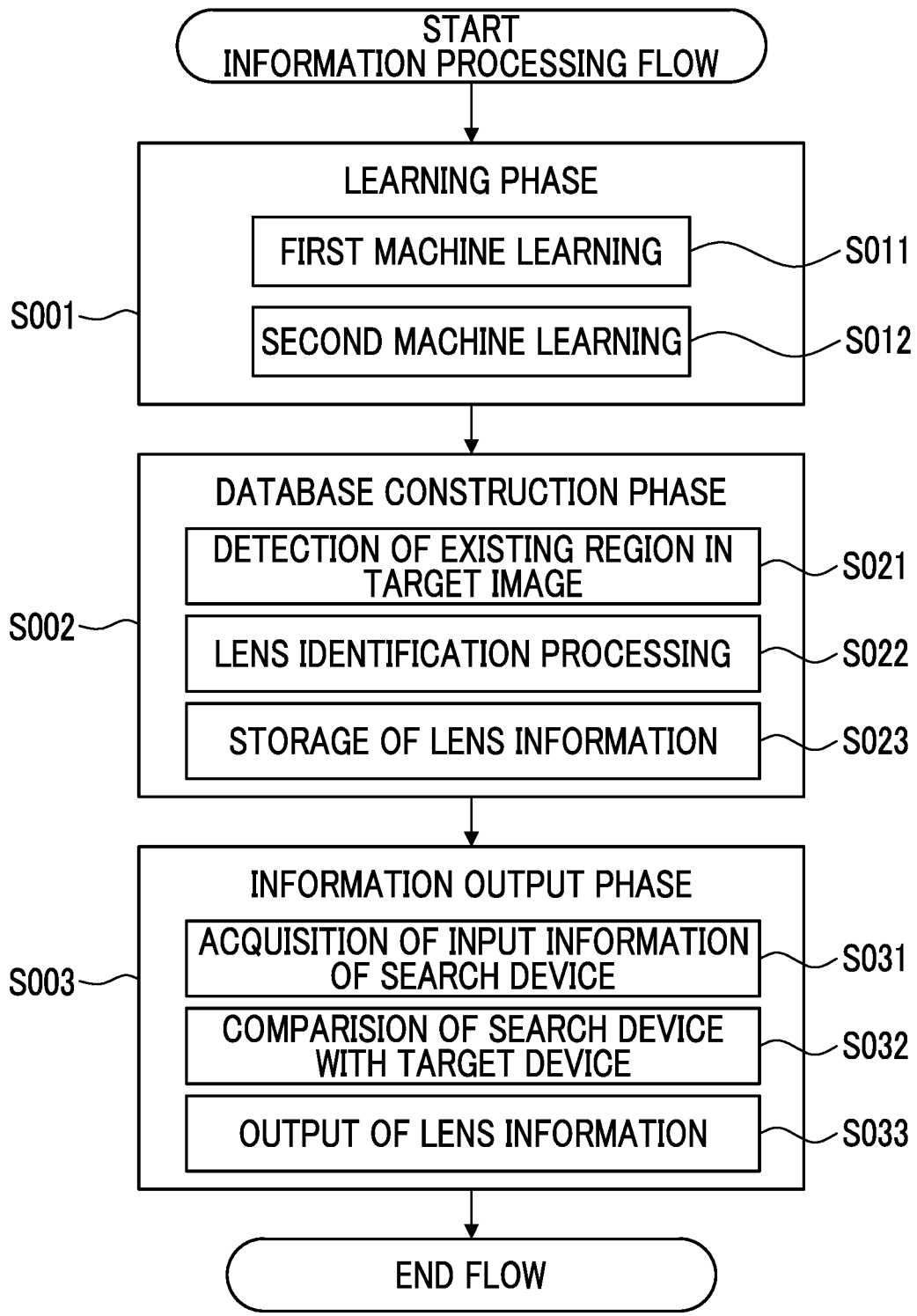
FIG. 6 is a diagram showing an information processing flow using the information processing apparatus according to the embodiment of the present invention.

As shown in FIG. 6, the information processing flow of the present embodiment proceeds in the order of a learning phase S001, a database construction phase S002, and an information output phase S003. Hereinafter, each phase will be described.

[Learning Phase]

The learning phase S001 is a phase in which machine learning is executed in order to construct a model required in the subsequent phases. In the learning phase S001, as shown in FIG. 6, first machine learning S011 and second machine learning S012 are executed.

The first machine learning S011 is machine learning for constructing the identification model M1, and is executed using a plurality of learning images showing a lens cross section as described above. In the present embodiment, supervised learning is executed as the first machine learning S011. In the supervised learning, a learning image representing one lens cross section and a ground truth label indicating a type of a lens appearing in the learning image are used as a learning data set.

In addition, in the first machine learning S011, as described above, a plurality of learning images including two or more same-type lens cross-sectional images showing cross sections of the same type of lens with different drawing styles may be used. In this case, the identification model M1 (strictly speaking, the derivation model Ma) is constructed to derive a common feature amount from the two or more same-type lens cross-sectional images.

The second machine learning S012 is machine learning for constructing a detection model for detecting an existing region of a lens in a target image. The detection model is a model for detecting an existing region from a target image by using an object detection algorithm.

As the object detection algorithm, a region-based CNN (R-CNN), a Fast R-CNN, you only look once (YOLO), and a single shot multibox detector (SDD) can be used. In the present embodiment, an image detection model using the YOLO is constructed from the viewpoint of the detection speed. As the YOLO, Yolo-version (v)3 and Yolo-v4 can be used.

Learning data (teacher data) used in the second machine learning S012 is created by applying an annotation tool to the learning image. The annotation tool is a tool for giving related information such as a ground truth label (tag) and coordinates of an object to target data as an annotation. As the annotation tool, for example, labelImg manufactured by Tzutalin, VoTT manufactured by Microsoft, or the like can be used.

In order to create the learning data used in the second machine learning S012, for example, an image showing a cross section of one lens or a lens group is prepared as the learning image. Specifically, the lens cross-sectional image is extracted from the patent publication in which the lens cross-sectional image is published. Then, the annotation tool is started, the above-described learning image is displayed, a region in which the lens exists is surrounded by a bounding box, and the region is annotated (labeled), thereby creating the learning data.

In addition, the learning data may be created by a method other than the above-described method, and for example, the learning image may be prepared by a lens image generation program. The lens image generation program is a program for automatically drawing a lens cross-sectional image by designating a type of a spherical lens and setting parameters of each part of the lens (for example, a curvature radius of a curved part and a thickness of a center portion). A large number of lens cross-sectional images of each type can be acquired by randomly setting each parameter for each type of spherical lens by the lens image generation program. The acquired lens cross-sectional image is used as the learning data together with the type of the lens designated in the case of image creation.

By performing the second machine learning S012 using the above-described learning data, a detection model, which is an object detection model in the YOLO format, is constructed.

[Database Construction Phase]

The database construction phase S002 is a phase in which a lens or a lens group appearing in a target image published in the patent publication is identified, and information (lens information) about the identified lens or lens group is accumulated to construct the database 22.

In the database construction phase S002, first, the processor 11 of the information processing apparatus 10 extracts a target image from the patent publication, applies the above-described detection model to the extracted target image, and detects an existing region in the target image (S021). That is, in this step S021, the processor 11 detects the existing region of the lens in the target image by using the object detection algorithm (specifically, YOLO).

In this case, in a case in which images of a plurality of lens cross sections are included in the target image, such as a target image showing a cross section of a part including a lens group, the processor 11 detects the existing region for each lens in the target image (see FIG. 4).

Next, the processor 11 identifies the lens existing in the existing region based on the feature amount of the existing region by the identification model M1 (S022). Specifically, the processor 11 inputs an image piece of the existing region detected in step S021 to the identification model M1. In the derivation model Ma at the previous stage of the identification model M1, the feature amount of the existing region is derived.

In the specific model Mb at the subsequent stage, the type of the lens existing in the existing region and the geometric information of the existing region are specified based on the feature amount of the existing region input from the derivation model Ma. In this case, a plurality of candidates of the lens type are specified based on the feature amount of the existing region, and the certainty degree is calculated for each candidate. In the specific model Mb, for example, the candidate having the highest certainty degree is specified as the type of the lens existing in the existing region. However, the present invention is not limited to this, and for example, all the candidates whose certainty degree satisfies a predetermined condition may be specified as the type of the lens existing in the existing region.

In a case in which a plurality of existing regions are detected in step S021, lens identification processing (that is, step S022) using the identification model M1 is repeatedly executed for each existing region. Accordingly, for the target image showing the cross section of the part including the lens group, each lens in the lens group can be identified for each existing region. That is, for each of the plurality of existing regions included in the target image, the candidate of the type of the lens existing in the existing region, the certainty degree of the candidate, and the geometric information of the existing region (position in the target image) are specified for each region.

In addition, in a case in which each lens in the lens group is identified for each existing region, the processor 11 aggregates information about each lens in the lens group identified for each existing region with the lens group as one unit. Specifically, the processor 11 generates the information about the lens group, for example, the character string information, based on the type of each lens in the lens group specified for each existing region and the existing region position (coordinates).

Figure 7:
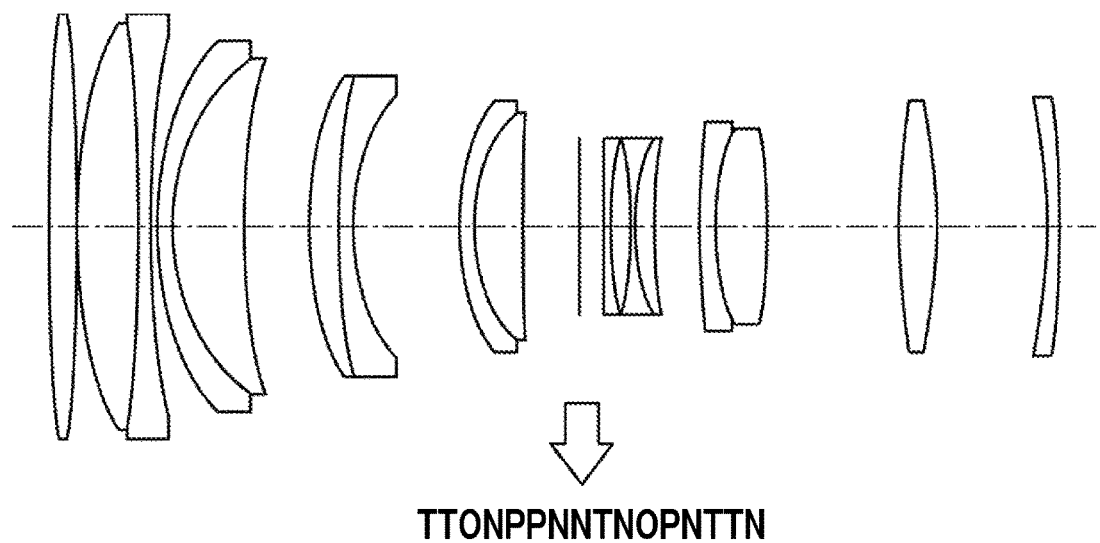
FIG. 7 is a diagram showing character string information about a lens group.

With regard to a procedure for generating the character string information, as an example, the processor 11 calculates a center position of an x-coordinate or a y-coordinate for each of the plurality of existing regions in the target image. Here, in a case in which there are two or more existing regions where the calculated center positions are close to each other, it is considered that the lenses existing in the two or more existing regions belong to the same lens group. Then, for two or more lenses belonging to the same lens group, the character information (reference numeral) indicating the type of the lens is disposed in order from the lens at a position closest to the reference position. By such a procedure, the character string information as shown in FIG. 7 can be obtained. In this case, the character string information of the mirror image in the reverse order may also be generated.

Figure 8:
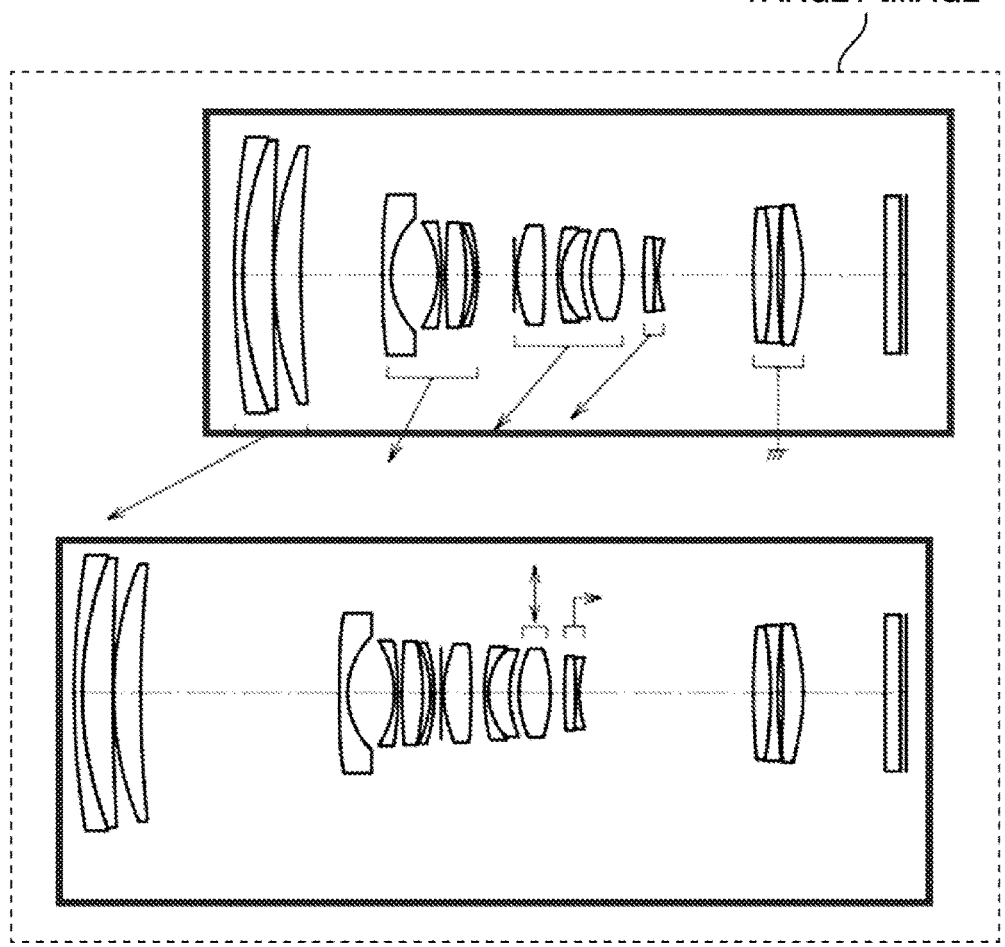
FIG. 8 is a diagram showing an example in which two lens groups are shown in an image.

As shown in FIG. 8, a plurality of lens groups may be shown in the target image for reasons such as illustrating an operation or state transition of each lens of the lens group. In this case, according to the above generation procedure, the character string information can be generated for each lens group, and in the case shown in FIG. 8, the character string information can be generated for each of the lens group on an upper side and the lens group on a lower side.

Next, the processor 11 stores the information about the identified lens of the target device, specifically, the character information indicating the type of the lens in the storage 16 (S023). In addition, for the target device comprising the lens group, character information indicating the type of each lens in the lens group identified for each existing region is aggregated with the lens group as one unit to generate the character string information, and the generated character string information is stored (accumulated) in the storage 16.

In a case in which a plurality of lens groups are shown in the target image as in the case shown in FIG. 8, the character string information is generated for each lens group as described above. In this case, the character string information generated for each lens group is stored (accumulated) in the storage 16 for each lens group.

In addition, the processor 11 stores (accumulates) the lens information including the character information or character string information in association with the information about the document including the target image (for example, identification information of a patent publication).

The series of steps S021 to S023 described above are repeatedly executed for each target image by changing the target image. Accordingly, the information (lens information) about the lens of the target device is stored and accumulated in the storage 16 for each target image, and as a result, the database 22 of the lens information about the lens of the target device is constructed. Then, according to the database 22, the target device in which the lens information is stored, the target image showing the lens of the target device, and the patent publication in which the target image is published can be searched for using the lens information as a key.

[Information Output Phase]

The information output phase S003 is a phase in which the lens information accumulated in the database 22 is output according to a predetermined condition. Specifically, at a start of the information output phase S003, the user performs an input operation about the lens included in the search device. Here, it is assumed that the lens included in the search device is a lens group consisting of a plurality of lenses.

The processor 11 of the information processing apparatus 10 acquires input information indicating the content of the above-mentioned input operation (S031). In this step S031, the processor 11 acquires, as the input information, character information indicating a type of a lens included in the search device, and more specifically, character string information in which types of lenses in a lens group are sequentially input.

After acquiring the input information, the processor 11 compares the lens group of the target device in which the lens information is stored in the database 22 with the lens group included in the search device (S032). Specifically, the processor 11 calculates a degree of similarity between the character string information about the lens group of the search device indicated by the input information acquired in step S031 and the character string information accumulated in the database 22 for each target image. The calculated degree of similarity corresponds to a degree of similarity between the lens (lens group) of the search device and the lens (lens group) of the target device.

In the present embodiment, a Levenstein distance method is adopted to evaluate the degree of similarity between pieces of character string information. However, an algorithm for calculating the degree of similarity between the pieces of character string information is not particularly limited, and may be, for example, a Gestalt pattern matching method, a Jaro-Winkler distance method, or another degree of similarity calculation method.

In the present embodiment, two types of degree of similarity can be calculated. In a case of calculating a first degree of similarity, which is one of the two types of degree of similarity, the character string information about the lens group of the search device acquired as the input information and the character string information about the lens group of the target device accumulated in the database 22 are used. The first degree of similarity between the lens group of the search device and the lens group of the target device is calculated based on these character string information.

A calculation example of the first degree of similarity will be described by taking the following two pieces of character string information A and B as an example.

Character string information A: NNNOTNTTOTNTOT
Character string information B: NNNOTNOOOTNTOT The first degree of similarity is calculated by the Levenstein distance method, in which the number of times the characters are deleted or added is evaluated until the two pieces of character string information to be compared match, and the number of times (score) is taken as the degree of similarity. Since the seventh character of the character string information A and the eighth character of the character string information B are different from each other, the characters are deleted and added twice each in order to match both character string information. Therefore, the degree of similarity between the two pieces of character string information A and B, that is, the first degree of similarity is 4 (=2+2). As the first degree of similarity is smaller, the two pieces of character string information are more similar to each other.

According to the above-described first degree of similarity, since the pieces of character string information are compared with each other as it is, the degree of similarity between the two pieces of character string information can be evaluated directly (simply).

In a case of calculating a second degree of similarity, which corresponds to the other of the two types of degree of similarity, any character of the character string information indicated by the input information, for example, one character is changed to a blank. The second degree of similarity is calculated based on the changed character string information and the character string information indicated by the lens information accumulated in the database 22. That is, the second degree of similarity between the lens group of the search device and the lens group of the target device is calculated based on the character string information acquired as the input information in which a part of the characters is changed to a blank for the lens group of the search device and the character string information about the lens group of the target device accumulated in the database 22.

As with the first degree of similarity, the second degree of similarity is calculated by the Levenstein distance method, and specifically, the number of times (score) the characters are deleted or added is evaluated until the two pieces of character string information to be compared match, and the number of times is used as the degree of similarity. In addition, in a case in which the pieces of character string information are compared with each other, it is not determined whether or not the characters match with respect to the part changed to the blank. In other words, the second degree of similarity is calculated by comparing the characters in a part of the character string information excluding a blank. For example, with regard to a case in which the seventh character of the character string information A is made blank using the above-described two pieces of character string information A and B as an example, a score is 2, and this score may be used as the second degree of similarity.

Character string information A: NNNOTN_TOTNTOT
Character string information B: NNNOTNOOOTNTOT As a method of calculating the second degree of similarity, the parts to be changed to blanks in the character string information indicated by the input information are changed in order, a score is calculated for each changed character string information, and an average value thereof may be calculated as the second degree of similarity.

According to the above-described second degree of similarity, even in a case in which an error, a detection omission, or the like occurs in a case in which each lens in the lens group appearing in the target image is identified by the identification model M1, the degree of similarity between the pieces of character string information can be appropriately calculated based on that fact.

In the present embodiment, as described above, the character string information is compared between the lens group of the search device and the lens group of the target device, and the degree of similarity is evaluated as a result of the comparison. In this case, the degree of similarity may be evaluated by clustering the character string information accumulated in the database 22 and specifying a cluster to which the input character string information about the lens group of the search device belongs.

After the calculation of the degree of similarity, the processor 11 outputs the information about the lens of the target device accumulated in the database 22, specifically, the character string information about the lens group included in the target device in association with the search device, based on the above-described input information (S033). The term "the information about the lens of the target device (for example, the character string information) is output in association with the search device" means that the information about the lens group of the target device accumulated in the database 22 (for example, the character string information) is output in such a manner that a relationship (specifically, the degree of similarity of the lens group) between the lens of the search device and the lens of the target device can be recognized.

In step S033, the processor 11 outputs the information about the lens of the target device accumulated in the database 22 in association with the calculated degree of similarity, and specifically, outputs the information in association with one or both of the first degree of similarity and the second degree of similarity. More specifically, for example, from the character string information about the lens group of the target device accumulated in the database 22, only the character string information having the highest first degree of similarity or second degree of similarity may be extracted and output.

However, the present invention is not limited to the above case, and for example, character string information in which the first degree of similarity or the second degree of similarity exceeds a preset reference value may be extracted, and the extracted character string information may be output.

Figure 9:
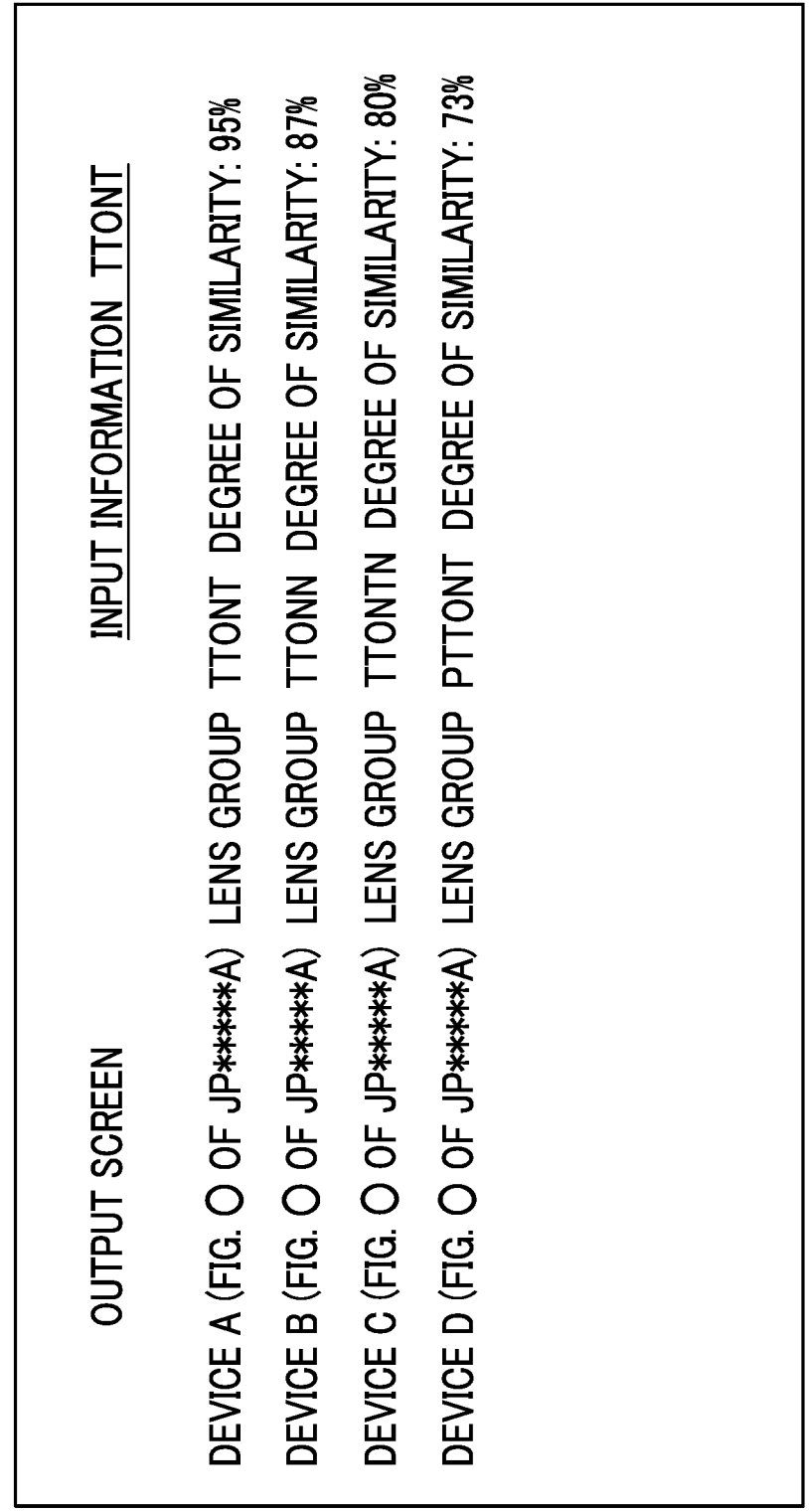
FIG. 9 is a diagram of a screen example showing an execution result of information output processing.

Alternatively, as shown in FIG. 9, M pieces (M is a natural number of 2 or more) of character string information may be extracted in order from the one having the highest first degree of similarity or second degree of similarity, and the extracted M pieces of character string information may be output.

Alternatively, all pieces of the character string information about the lens group of the target device accumulated in the database 22 may be output in order from the one having the highest first degree of similarity or second degree of similarity (or the one having the lowest degree of similarity).

In addition, the character string information extracted based on both the first degree of similarity and the second degree of similarity may be output. For example, an average value of the first degree of similarity and the second degree of similarity may be obtained, and the character string information having the highest average value or the M pieces of character string information extracted in order from the highest average value may be output, or all pieces of the character string information may be output in order of the average value. In this case, the above-mentioned average value may be a simple average value of the first degree of similarity and the second degree of similarity. Alternatively, each of the first degree of similarity and the second degree of similarity may be multiplied by a weight (coefficient) to calculate the average value. In this case, the weight to be multiplied by the first degree of similarity may be larger than the weight to be multiplied by the second degree of similarity, or conversely, it may be smaller.

The aspect of outputting the lens information (specifically, the character string information about the lens group) in association with the degree of similarity is not particularly limited as long as a lens group more similar to the lens group included in the search device can be recognized.

In addition, in a case of outputting the character string information, for example, a document in which a lens cross-sectional image (that is, a target image) of the lens group indicated by the character string information is published, specifically, an identification number of a patent publication, or the like is also output (see FIG. 9). Accordingly, for the lens group of the search device whose character string information is input by the user, a patent publication in which a lens cross-sectional image of a lens group similar to the lens group is published can be found.

About Effectiveness of Present Embodiment

The information processing apparatus 10 according to the present embodiment can identify the lens in the target image showing the cross section of the part including the lens in the target device based on the feature amount of the existing region of the lens by the identification model M1 constructed by machine learning. In addition, the information processing apparatus 10 according to the present embodiment constructs the database 22 by storing the information (lens information) about the identified lens of the target device in association with the information on the document in which the target image is published. Information such as the lens information and the document accumulated in the database 22 is used in a searchable state.

In detail, in the technique in the related art, a correspondence relationship between the feature amount of the lens appearing in the image and the lens type was ruled, and the lens in the image was identified according to the rule. However, in a case in which the drawing style of the lens is different from the normal style, there was a concern that the lens drawn in the different style cannot be identified unless the identification rule adaptable to the drawing style is prepared. In such a case, the identification result of the lens cannot be obtained, and it is difficult to use the lens information obtained from the identification result.

On the other hand, in the present embodiment, the identification model M1, which is a result of the machine learning, is used, and the lens existing in the existing region can be satisfactorily identified based on the feature amount of the existing region in the target image. That is, in the present embodiment, even though the drawing style is changed, the feature amount of the existing region of the lens drawn in the drawing style can be specified, and, in a case in which the feature amount can be specified, the lens can be identified from the feature amount.

Then, since the lens information about the identified lens is accumulated for each target image and stored in a database, the lens information can be used in a searchable manner thereafter. In addition, in the database, the lens information is associated with the information on the document in which the target image is published. Accordingly, the target document can be found using the lens information as key information. For example, it is possible to find a document in which a lens cross-sectional image of a lens group that is the same as or similar to the lens group included in the search device is published.

OTHER EMBODIMENTS

Although the information processing apparatus, the information processing method, and the program according to the embodiment of the present invention have been described above with reference to specific examples, the above-described embodiment is merely an example, and other embodiments may be considered.

For example, the computer constituting the information processing apparatus may be a server used for an application service provider (ASP), a software as a service (SaaS), a platform as a service (PaaS), an infrastructure as a service (IaaS), or the like. In this case, a user who uses the service such as the ASP operates a terminal (not shown) to transmit the input information about the search device to the server. In a case of receiving the input information, the server outputs the lens information accumulated in the database 22 to the terminal of the user based on the input information. On the terminal side of the user, information sent from the server is displayed or a sound is reproduced.

In addition, in the above-described embodiment, a case in which machine learning (first and second machine learning) for constructing various models is performed by the information processing apparatus 10 has been described, but the present invention is not limited to this. A part or an entirety of the machine learning may be performed by another device (computer) different from the information processing apparatus 10. In this case, the information processing apparatus 10 acquires a model constructed by machine learning performed by another apparatus. For example, in a case in which the first machine learning is performed by another device, the information processing apparatus 10 acquires the identification model M1 from the other device, and the lens appearing in the target image is identified by the acquired identification model M1.

In addition, in the above-described embodiment, a case in which the input information acquired in the information output phase S003 is the character string information indicating the type of each lens in the lens group included in the search device has been described. In addition, in the above-described embodiment, a case in which the degree of similarity between the search device and the target device is calculated by comparing the input character string information with the character string information about the lens group of the target device accumulated in the database 22 has been described. However, the present invention is not limited to this, and for example, the input information may be a cross-sectional image of a lens group included in the search device. In this case, each lens in the lens group included in the search device is identified from the lens cross-sectional image which is the input information, and the character string information about the lens group is generated based on the identification result. In a case of identifying each lens in the lens group, the identification model M1 constructed by the first machine learning may be diverted, and in such a case, transfer learning may be further executed.

In addition, in a case in which the input information is a lens cross-sectional image, a model for calculating the degree of similarity between the images may be used. That is, the degree of similarity between the lens cross-sectional image showing the lens group of the search device and the lens cross-sectional image (that is, the target image) showing the lens group of the target device may be calculated. In this case, the calculation model of the degree of similarity is preferably a model for highly evaluating the degree of similarity between two lens cross-sectional images (same-type lens cross-sectional images) in which the same type of lens is drawn in different drawing styles. Specifically, it is preferable that the same label (ground truth label) is attached to a plurality of same-type lens cross-sectional images, and that machine learning is executed using the labeled image data to construct the calculation model of the degree of similarity.

In addition, in the above-described embodiment, a case in which the existing region of the lens in the target image is automatically detected by the detection model constructed by the machine learning has been described, but the present invention is not limited to this. For example, the target image may be displayed on a screen, the user may designate the existing region of the lens through the screen (for example, surrounding with a bounding box, and inputting coordinates of each vertex of the existing region), and the existing region may be detected based on the operation.

In addition, in the above-described embodiment, a case in which one lens exists in one existing region in the target image, and one lens existing in one existing region is identified by the identification model M1 has been described. However, the present invention is not limited to this, and a plurality of lenses may exist in one existing region. In this case, it is preferable that whether or not a plurality of lenses exist in one existing region is determined based on the feature amount of the one existing region by the identification model M1, and that in a case in which a plurality of lenses exist, a combination of the lenses is identified.

EXPLANATION OF REFERENCES

10: information processing apparatus
11: processor
12: memory
13: external interface
14: input device
15: output device
16: storage
21: program
22: database
M1: identification model
Ma: derivation model
Mb: output model

What is claimed is:

1. An information processing apparatus comprising:
a processor,
wherein the processor
detects an existing region of a lens, which is a region in which the lens exists, in a target image showing a cross section of a part including the lens in a target device including the lens,
identifies the lens of the target device existing in the existing region based on a feature amount of the existing region by an identification model constructed by machine learning using a plurality of learning images showing a cross section of the lens, and
the identification model is configured by machine learning using the plurality of learning images including two or more same-type lens cross-sectional images showing cross sections of the same type of lens with different drawing styles, the identification model being a model that identifies a lens shown by each of the two or more same-type lens cross-sectional images as the same type of lens.

2. The information processing apparatus according to claim 1,
wherein the processor accumulates information about the identified lens of the target device to construct a database of the information.

3. A database device acquiring information about the identified lens of the target device from the information processing apparatus according to claim 1 and accumulating the information.

4. The database device according to claim 3,
wherein the database device accumulates the information about the identified lens of the target device in association with information about a document including the target image.

5. An information processing apparatus comprising:
a processor,
wherein the processor
- detects an existing region of a lens, which is a region in which the lens exists, in a target image that shows a cross section of a part including the lens in a target device including the lens and that is published or inserted in documents,
- identifies the lens of the target device existing in the existing region based on a feature amount of the existing region by an identification model constructed by machine learning using a plurality of learning images showing a cross section of the lens,
- accumulates information about the identified lens of the target device to construct a database of the information,
- acquires input information about a lens provided in a search device,
- calculates a degree of similarity between the lens of the search device and the lens of the target device based on the input information and the information about the lens of the target device accumulated in the database, and
- outputs the information about the lens of the target device accumulated in the database in association with the degree of similarity.

6. An information processing apparatus comprising:
a processor,
wherein the processor
- detects an existing region of a lens, which is a region in which the lens exists, in a target image that shows a cross section of a part including the lens in a target device including the lens and that is published or inserted in documents,
- identifies the lens of the target device existing in the existing region based on a feature amount of the existing region by an identification model constructed by machine learning using a plurality of learning images showing a cross section of the lens,
- accumulates information about the identified lens of the target device to construct a database of the information,
- detects the existing region for each lens in the target image showing a cross section of a part including lens groups arranged in a row in the target device including the lens groups,
- identifies a lens in the lens group existing in the existing region for each existing region by using the identification model,
- aggregates information about the lens in the lens group identified for each existing region with the lens group as one unit, and accumulates the aggregated information in the database,
- specifies, for each existing region, a type of the lens in the lens group identified for each existing region,
- generates character string information representing the type of each lens in an order in which the lenses are arranged in the lens group, based on the type of the lens in the lens group specified for each existing region and a position of the existing region in the target image,
- accumulates the generated character string information in the database,
- acquires input information about a lens included in a search device,
- in a case in which the search device includes a lens group, acquires character string information representing a type of each lens in an order in which lenses are arranged in the lens group of the search device, as the input information,
- calculates a first degree of similarity between the lens group of the search device and the lens group of the target device, based on the acquired character string information about the lens group of the search device and the character string information about the lens group of the target device accumulated in the database, and
- outputs the character string information about the lens group of the target device accumulated in the database in association with the first degree of similarity.

7. An information processing method comprising:
via a processor,
a step of detecting an existing region of a lens, which is a region in which the lens exists, in a target image showing a cross section of a part including the lens in a target device including the lens;
via the processor,
a step of identifying the lens of the target device existing in the existing region based on a feature amount of the existing region by an identification model constructed by machine learning using a plurality of learning images showing a cross section of the lens; and
the identification model is configured by machine learning using the plurality of learning images including two or more same-type lens cross-sectional images showing cross sections of the same type of lens with different drawing styles, the identification model being a model that identifies a lens shown by each of the two or more same-type lens cross-sectional images as the same type of lens.

* * * * *